(12) United States Patent
Chan et al.

(10) Patent No.: US 8,294,851 B2
(45) Date of Patent: Oct. 23, 2012

(54) MANUFACTURING METHOD OF LIQUID CRYSTAL DISPLAY PANEL

(75) Inventors: Te-Wei Chan, Hsinchu County (TW); Chieh-Wei Chen, Taichung County (TW); Cheng-Han Tsao, Taipei County (TW); Chung-Yi Chiu, Tainan County (TW)

(73) Assignee: Au Optronics Corporation, Hsinchu (TW)

( * ) Notice: Subject to any disclaimer, the term of this patent is extended or adjusted under 35 U.S.C. 154(b) by 123 days.

(21) Appl. No.: 12/793,687

(22) Filed: Jun. 4, 2010

(65) Prior Publication Data

US 2010/0240273 A1 Sep. 23, 2010

Related U.S. Application Data

(63) Continuation of application No. 12/199,808, filed on Aug. 28, 2008.

(30) Foreign Application Priority Data

Jun. 27, 2008 (TW) .............................. 97124238 A

(51) Int. Cl.
*G02F 1/1333* (2006.01)
(52) U.S. Cl. ................ 349/93; 349/92; 349/94; 349/38; 349/39; 445/24
(58) Field of Classification Search .................... 349/38, 349/39, 43, 47, 129, 128, 93, 94, 92; 445/24
See application file for complete search history.

(56) References Cited

U.S. PATENT DOCUMENTS

| 7,733,430 | B2 | 6/2010 | Huang et al. | |
| 7,864,280 | B2 * | 1/2011 | Hanaoka | 349/134 |
| 8,134,653 | B2 | 3/2012 | Huang et al. | |
| 2005/0185131 | A1 * | 8/2005 | Miyachi et al. | 349/167 |
| 2006/0061700 | A1 * | 3/2006 | Chung et al. | 349/38 |
| 2007/0097279 | A1 * | 5/2007 | Sugiura | 349/38 |
| 2007/0159587 | A1 * | 7/2007 | Kim et al. | 349/144 |

(Continued)

FOREIGN PATENT DOCUMENTS

TW 200809349 2/2008

(Continued)

OTHER PUBLICATIONS

"Office Action of Taiwan Counterpart Application", issued on Mar. 30, 2012, p. 1-p. 11, in which the listed references were cited.

*Primary Examiner* — Edward Glick
*Assistant Examiner* — Sang Nguyen
(74) *Attorney, Agent, or Firm* — Jianq Chyun IP Office

(57) ABSTRACT

A method for manufacturing a liquid crystal display panel including the steps is provided. A semi-finished liquid crystal display panel including a first substrate, a second substrate, a liquid crystal layer, an opposing electrode, scan lines, data lines, polymerizable molecules, pixel structures, first capacitor bottom electrodes, and second capacitor bottom electrodes is provided. Each pixel structure has a first pixel electrode and a second pixel electrode, and the blocks of the liquid crystal layer corresponding to the first pixel electrodes and the second pixel electrodes are respectively a plurality of first blocks and a plurality of second blocks. Then, a first voltage difference and a second voltage difference are respectively formed in the first blocks and the second blocks respectively, wherein the first voltage difference is different from the second voltage difference. Accordingly, the polymerizable molecules are polymerized to form the liquid crystal display panel.

10 Claims, 15 Drawing Sheets

U.S. PATENT DOCUMENTS

| | | | |
|---|---|---|---|
| 2008/0030636 A1* | 2/2008 | Huang et al. | 349/38 |
| 2008/0036931 A1* | 2/2008 | Chan et al. | 349/38 |
| 2008/0123038 A1* | 5/2008 | Suwa et al. | 349/129 |
| 2009/0109386 A1* | 4/2009 | Chen et al. | 349/123 |
| 2010/0201935 A1 | 8/2010 | Huang et al. | |

FOREIGN PATENT DOCUMENTS

| | | |
|---|---|---|
| WO | 2007135853 | 11/2007 |

* cited by examiner

MANUFACTURING METHOD OF LIQUID CRYSTAL DISPLAY PANEL

CROSS-REFERENCE TO RELATED APPLICATION

This application is a continuation application of a prior application Ser. No. 12/199,808 filed on Aug. 28, 2008. The prior application Ser. No. 12/199,808 claims the priority benefit of Taiwan application serial no. 97124238, filed on Jun. 27, 2008. The entirety of each of the above-mentioned patent applications is hereby incorporated by reference herein and made a part of specification.

BACKGROUND OF THE INVENTION

1. Field of the Invention

The present invention relates to a manufacturing method thereof, and particularly to a manufacturing method of a polymer stabilized alignment liquid crystal display panel.

2. Description of Related Art

As display technology advances, the use of displays makes our life much more convenient. Flat panel displays (FPD) have thus become the current trend for the characteristic of lightness and thinness. Among all flat panel displays, liquid crystal displays (LCD) are especially popular.

The demand for wider view angles of liquid crystal displays is growing. At present, multi-domain vertical alignment (MVA) liquid crystal display (LCD) panels are common application of wide view angle technology. A MVA-LCD panel utilizes an alignment structure to control liquid crystal molecules in different regions to tilt in different directions, and thereby achieves the effects of wide view angle. However, the tilt directions of the liquid crystal molecules around the alignment structure are usually not ideal so as to cause disclination, which may result in light leakage. Accordingly, an alignment method, which is formed by a polymer alignment together with a pixel electrode having a plurality of fine slits, is provided to improve the display effects of a MVA-LCD panel.

Polymer alignment technology is first to dope polymerizable molecules (monomers) with proper concentration into a liquid crystal material, wherein a liquid crystal mixture is called hereafter. Then, a voltage is applied to the liquid crystal mixture. When the liquid crystal molecules are stably arranged by the voltage, an ultraviolet light irradiation or a heating process is used to bond the polymerizable molecules (monomers) into a polymer layer, so as to complete the stabilized alignment process.

The voltage described above may be applied by a voltage of a capacitor electrode coupling to a pixel electrode. Conventionally, the capacitor electrode requires a higher voltage to enhance the capacitance coupling effect between the capacitor electrode and the pixel electrode, so as to control the arrangement of the liquid crystal molecules. Hence, during the polymer stabilized alignment process, a high voltage difference usually exists between the capacitor electrode not covered by the pixel electrode and an opposing electrode. If the area of the capacitor electrode not covered by the pixel electrode becomes larger, it will be more difficult to control the arrangement of liquid crystal molecules in certain areas. Accordingly, the problem of disclination therefore occurs.

SUMMARY OF THE INVENTION

The present invention provides a method for manufacturing a liquid crystal display panel for improving light leakage and non-uniform display when displaying images.

The present invention further provides a method for manufacturing a liquid crystal display panel having a favorable arrangement of liquid crystal molecules.

The present invention further provides a method for manufacturing a liquid crystal display panel which comprises providing a semi-finished liquid crystal display panel first, wherein the semi-finished liquid crystal display panel includes a first substrate, a second substrate, a liquid crystal layer, an opposing electrode, a plurality of scan lines, a plurality of data lines, a plurality of polymerizable molecules, a plurality of pixel structures, a plurality of first capacitor bottom electrodes, and a plurality of second capacitor bottom electrodes. The second substrate is opposite to the first substrate, and the liquid crystal layer is disposed between the first substrate and the second substrate. The opposing electrode is disposed between the second substrate and the liquid crystal layer. The scan lines and the data lines are disposed between the first substrate and the liquid crystal layer, and interlace each other. The pixel structures are disposed on the first substrate and electrically connected to the scan lines and the data lines, wherein each pixel structure has a first pixel electrode and a second pixel electrode, and the blocks of the liquid crystal layer corresponding to the first pixel electrodes and the second pixel electrodes are respectively a plurality of first blocks and a plurality of second blocks. The first capacitor bottom electrodes are disposed between the first pixel electrodes and the first substrate, and the second capacitor bottom electrodes are disposed between the second pixel electrodes and the first substrate. In addition, each second capacitor bottom electrode comprises a first pattern and a plurality of second patterns connected to the first pattern. The first pattern extends from a first side of the corresponding second pixel electrode to an opposite second side thereof, and the second patterns are disposed on the first side and the second side, wherein at least a portion of the second patterns overlaps a region between the second pixel electrode and the corresponding data lines. Then, a first voltage difference and a second voltage difference are respectively formed in the first blocks and the second blocks respectively, wherein the first voltage difference is different from the second voltage difference. Accordingly, the polymerizable molecules are polymerized to form a liquid crystal display panel.

The present invention further provides a method for manufacturing a liquid crystal display panel which comprises providing a semi-finished liquid crystal display panel, wherein the semi-finished liquid crystal display panel includes a first substrate, a second substrate, a liquid crystal layer, an opposing electrode, a plurality of scan lines, a plurality of data lines, a plurality of polymerizable molecules, a plurality of pixel structures, a plurality of first capacitor bottom electrodes, and a plurality of second capacitor bottom electrodes. The second substrate is opposite to the first substrate, and the liquid crystal layer is disposed between the first substrate and the second substrate. The opposing electrode is disposed between the second substrate and the liquid crystal layer. The scan lines and the data lines are disposed between the first substrate and the liquid crystal layer, and interlace each other. The pixel structures are disposed on the first substrate and electrically connected to the scan lines and the data lines, wherein each pixel structure comprises a first pixel electrode, a second pixel electrode, a first active device, and a second active device. The first active device and the second active device are electrically connected to one of the scan lines. The first active device and the second active device are respectively electrically connected to different data lines, and the first active device and the second active device are respectively electrically connected to the first pixel electrode and the second pixel electrode, wherein the blocks of the liquid crystal layer corresponding to the first pixel electrodes and the second pixel electrodes are respectively a plurality of first blocks and a plurality of second blocks. The first capacitor bottom electrodes are disposed between the first pixel electrodes and the first substrate, and the second capacitor bottom electrodes are disposed between the second pixel electrodes and the first substrate. Then, a first voltage difference and a second voltage difference are respectively formed in the first blocks and the second blocks for polymerizing the polymerizable molecules to form a liquid crystal display panel, wherein the first voltage difference is different from the second voltage difference.

In an embodiment of the present invention, the second pixel electrode comprises an intersection pattern and a plurality of stripe patterns, wherein the stripe pattern has a first end connected to the intersection pattern and a second end away from the intersection pattern, and the stripe patterns are apart from each other.

In an embodiment of the present invention, the second patterns of the second capacitor bottom electrodes are disposed under at least a portion of the second ends.

In an embodiment of the present invention, the intersection pattern comprises a first direction section and a second direction section, wherein the first direction section interlaces the second direction section, and the first patterns of the second capacitor bottom electrodes are substantially parallel to the first direction section. In an embodiment, the first direction section is substantially perpendicular to the second direction section.

In an embodiment of the present invention, the first patterns and the second patterns of the second capacitor bottom electrodes may be arranged in an H shape, a U shape, a reversed U shape, or an N shape.

In an embodiment of the present invention, a V-shaped main slit may be formed between the first pixel electrode and the second pixel electrode, wherein the V-shaped main slit includes a pointed end and two side sections connected to the pointed end. The pointed end is arranged toward the second pixel electrode, and an edge of the first pixel electrode and an edge of the second pixel electrode adjacent to each side section are substantially parallel to each other.

In an embodiment of the present invention, the first pixel electrode includes a first intersection pattern, a plurality of first stripe patterns, and a V-shaped connection pattern. An end of each first stripe pattern is connected to the first intersection pattern, and the other end of each first stripe pattern is away from the first intersection pattern. In addition, the first stripe patterns are apart from one another. The V-shaped connection pattern connects a portion of the first stripe patterns with the first intersection pattern, and the V-shaped main slit is disposed between the V-shaped connection pattern and the second pixel electrodes.

In an embodiment of the present invention, the second pixel electrode comprises a second intersection pattern and a plurality of second stripe patterns. The second stripe patterns are substantially apart from one another. An end of each second stripe pattern is connected to the second intersection pattern, and the other end of each second stripe pattern is away from the second intersection pattern, wherein two of the second stripe patterns are adjacent to the V-shaped main slit.

In an embodiment of the present invention, a liquid crystal display panel further comprises a plurality of first capacitor top electrodes and a plurality of coupling electrodes. The first capacitor top electrodes are disposed between the first pixel electrodes and the first capacitor bottom electrodes, and the first capacitor top electrodes are electrically connected to the first pixel electrodes. A portion of the coupling electrodes is arranged between the first capacitor bottom electrodes and the first pixel electrodes, and the coupling electrodes are electrically connected to the second pixel electrodes.

In an embodiment of the present invention, the opposing electrode may be electrically connected to the second capacitor bottom electrodes.

In an embodiment of the present invention, the pixel structure further comprises a first active device and a second active device, wherein the first active device and the second active device are electrically connected to one of the scan lines and one of the data lines, and the first active device and the second active device are respectively electrically connected to the first pixel electrode and the second pixel electrode.

In an embodiment of the present invention, the pixel structure further comprises a first active device and a second active device, wherein the first active device and the second active device are electrically connected to one of the scan lines. Additionally, the first active device and the second active device are respectively electrically connected to different data lines, and the first active device and the second active device are respectively electrically connected to the first pixel electrode and the second pixel electrode.

In an embodiment, the pixel structure further comprises a third pixel electrode electrically connected to the second pixel electrode. In an embodiment, the second capacitor bottom electrode further comprises a third pattern parallel to the first pattern. The third pattern is disposed between the third pixel electrode and the first substrate, and a portion of each second pattern further extends to a side of the third pixel electrode to connect the third pattern.

In an embodiment of the present invention, a method for forming the first voltage difference and the second voltage difference comprises respectively providing a first voltage, a second voltage, and a third voltage to the first capacitor bottom electrodes, the second capacitor bottom electrodes, and the opposing electrode. In an embodiment, the first voltage is substantially larger than the second voltage, wherein the second voltage is substantially equal to the third voltage.

In an embodiment of the present invention, the first pixel electrodes and the second pixel electrodes are electrically connected to different data lines, and a method for forming the first voltage difference and the second voltage difference comprises respectively providing a first voltage and a second voltage to the first pixel electrodes and the second pixel electrodes by the data lines, wherein the first voltage and the second voltage are different. Moreover, a third voltage is provided to the opposing electrode.

In an embodiment of the present invention, the first voltage is substantially equal to 0~80 volts, the second voltage is substantially equal to 0~80 volts, and the third voltage is substantially equal to 0~80 volts.

In an embodiment of the present invention, the polymerizable molecules are, for example, a plurality of photo-polymerizable molecules, and a method for polymerizing the polymerizable molecules comprises a light illuminating method. In an embodiment, the light illuminating method is, for example, to use an ultraviolet light.

In an embodiment of the present invention, the polymerizable molecules are polymerized on the first substrate to form the polymer layer between the alignment layer and the liquid crystal layer.

In the liquid crystal display panel of the present invention, a portion of the second capacitor bottom electrodes is arranged between the second pixel electrodes and neighboring data lines. Hence, the second capacitor bottom electrodes also help to reduce the crosstalk effect which occurs between the second pixel electrodes and the data lines. Additionally, in the manufacturing method of the present invention, a common voltage of the opposing electrode may be applied to the second capacitor electrodes or different voltages may be respectively applied to the pixel electrodes through different data lines during the polymer stabilized alignment process. Hence, the capacitor electrodes which are not covered by the pixel electrodes do not influence the arrangement direction of the liquid crystal molecules during the polymer stabilized alignment process. Consequently, the liquid crystal molecules in the liquid crystal display panel are tilted and arranged in a favorable way.

To make the above features and advantages of the present invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
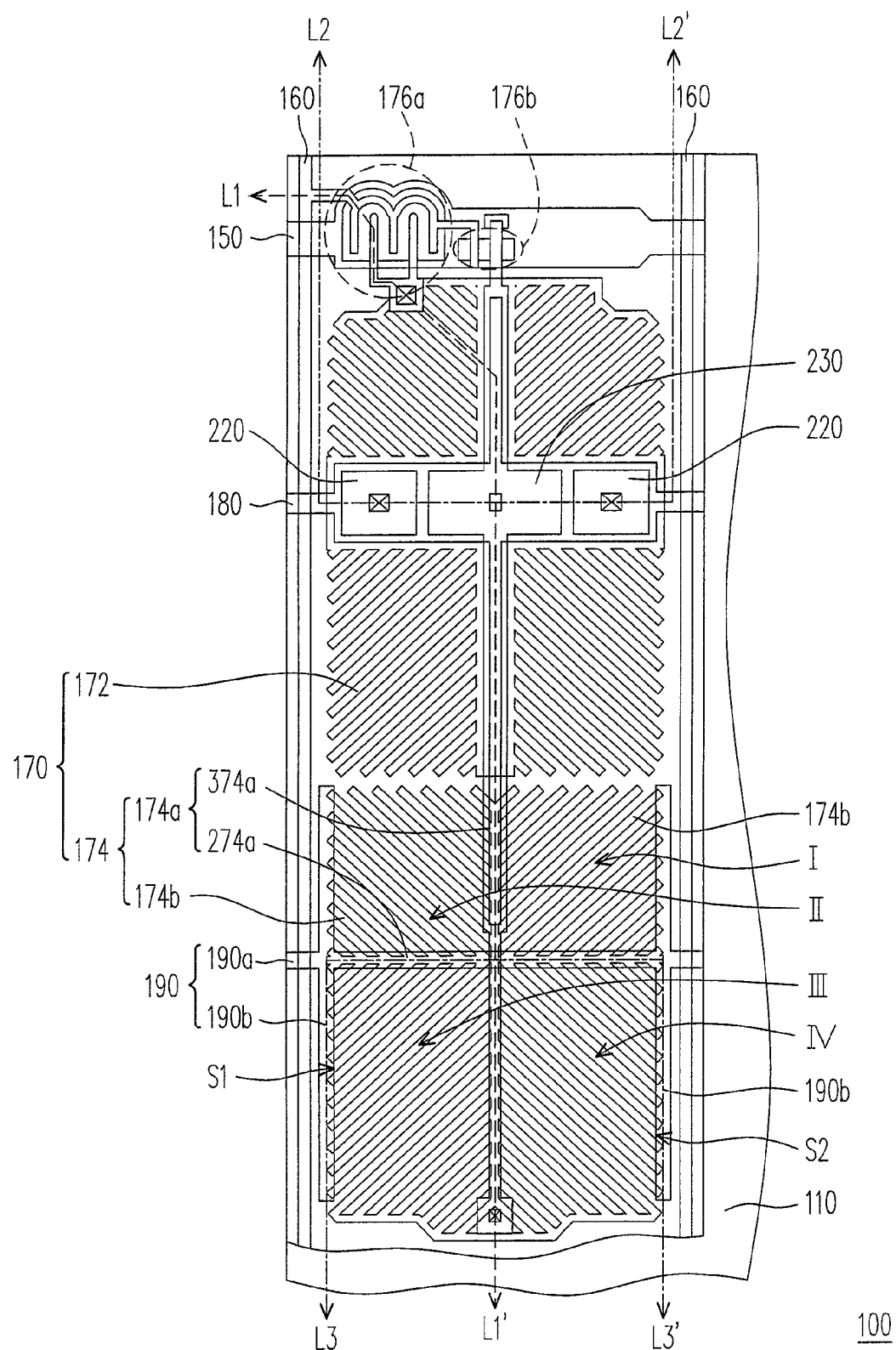
FIG. 1A illustrates a schematic view of a liquid crystal display panel according to the first embodiment of the present invention.
Figure 1B:
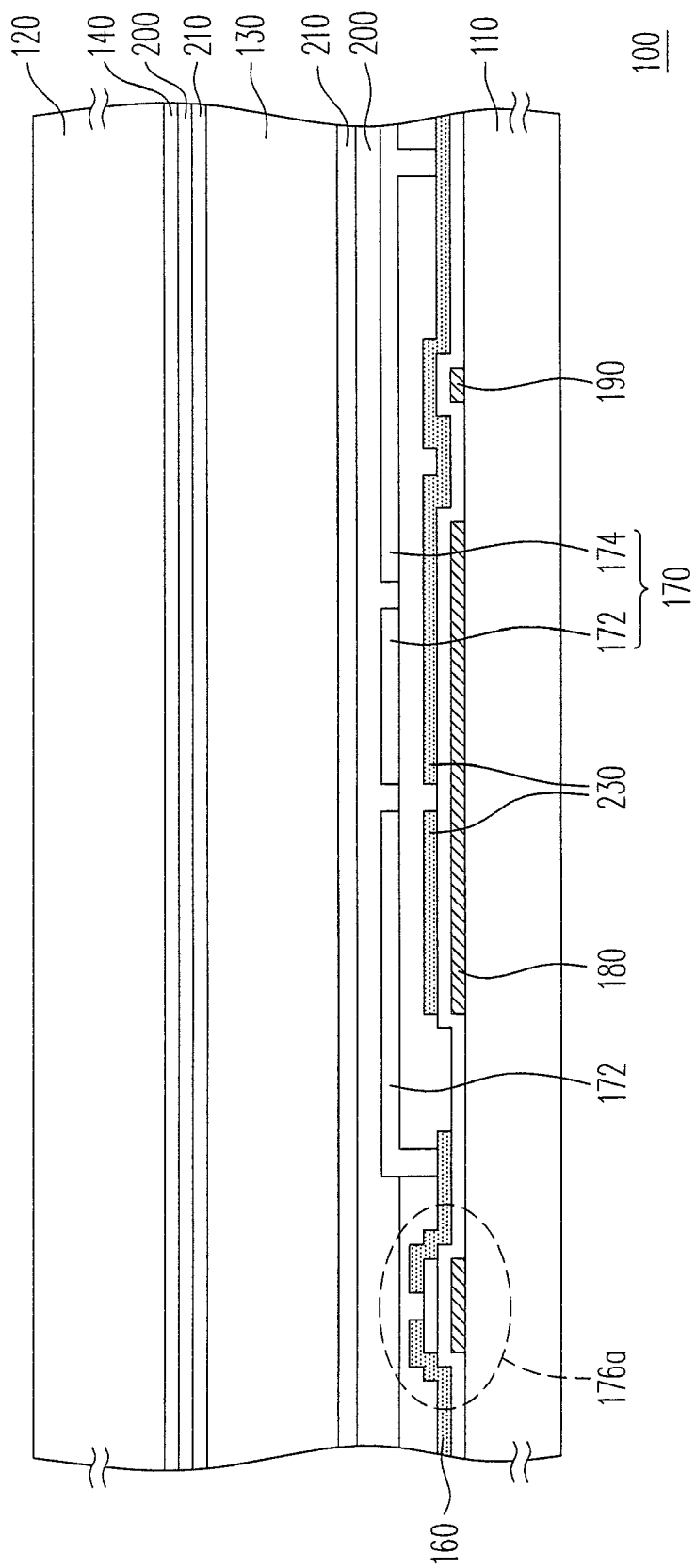
FIG. 1B illustrates a cross-sectional view along line L1-L1' in FIG. 1A.

FIG. 1A illustrates a schematic view of a liquid crystal display panel according to the first embodiment of the present invention, and FIG. 1B illustrates a cross-sectional view along Line L1-L1' in FIG. 1A. Referring to FIGS. 1A and 1B, a liquid crystal display panel 100 comprises a first substrate 110, a second substrate 120, a liquid crystal layer 130, an opposing electrode 140, a plurality of scan lines 150, a plurality of data lines 160, a plurality of pixel structures 170, a plurality of first capacitor bottom electrodes 180, a plurality of second capacitor bottom electrodes 190, at least an alignment layer 200, and at least a polymer layer 210. The liquid crystal display panel 100 is substantially a polymer stabilized alignment liquid crystal display panel. Herein, FIGS. 1A and 1B merely illustrate a part of the elements in an area of one pixel structure 170.

Based on the above, the second substrate 120 is opposite to the first substrate 110, and the liquid crystal layer 130 is disposed between the first substrate 110 and the second substrate 120. The opposing electrode 140 is disposed between the second substrate 120 and the liquid crystal layer 130. The scan lines 150 and the data lines 160 are disposed between the first substrate 110 and the liquid crystal layer 130 and interlace each other. The alignment layer 200 is disposed between the pixel structures 170 and the opposing electrode 140, and the polymer layer 210 is disposed between the alignment layer 200 and the liquid crystal layer 130. The pixel structures 170 are disposed on the first substrate 110 and electrically connected to the scan lines 150 and the data lines 160. Each pixel structure 170 has a first pixel electrode 172 and a second pixel electrode 174.

The first capacitor bottom electrodes 180 are at least disposed between the first pixel electrodes 172 and the first substrate 110. Particularly, most portion of the area of the first capacitor bottom electrodes 180 is disposed in the area where the first pixel electrodes are located, and a portion thereof further extends to the area where the second pixel electrodes are located. In addition, the second capacitor bottom electrodes 190 are disposed between the second pixel electrodes 174 and the first substrate 110.

When the liquid crystal display panel 100 displays images, the first capacitor bottom electrodes 180 and the second capacitor bottom electrodes 190 may have the same potential as the opposing electrode 140. Further, a portion of the first capacitor bottom electrodes 180 overlaps the first pixel electrodes 172, and a portion of the second pixel electrodes 174 overlaps the second capacitor bottom electrodes 190. Hence, a capacitance effect provided by the first capacitor bottom electrodes 180 helps to maintain a voltage difference between the first pixel electrodes 172 and the opposing electrode 140. Similarly, the capacitance effect provided by the second capacitor bottom electrodes 190 also helps to maintain the voltage difference between the second pixel electrodes 174 and the opposing electrode 140.

To improve display quality, in practice, two active devices 176a and 176b respectively electrically connected to the first pixel electrodes 172 and the second pixel electrodes 174 may be disposed on the first substrate 110. The active devices 176a and 176b are respectively used for controlling the display voltages of the first pixel electrodes 172 and the second pixel electrodes 174. When the liquid crystal display panel 100 displays images, a potential difference between the first pixel electrodes 172 and the opposing electrode 140 is, for example, larger than or equal to the potential difference between the second pixel electrodes 174 and the opposing electrode 140, so as to achieve different display brightness. Consequently, the images of the liquid crystal display panel 100 are properly improved to achieve better display effects.

Generally speaking, the larger the areas of the first pixel electrodes 172 and the second pixel electrodes 174 are, the better the aperture ratio (AR) of the liquid crystal display panel 100 becomes. However, as the aperture ratio excessively increases, the first pixel electrodes 172 and the second pixel electrodes 174 become closer to the data lines 160. Under this circumstance, crosstalk effect may occur in the liquid crystal display panel 100. For instance, as the second pixel electrodes 174 are closer to the data lines 160, the capacitance coupling effect between the second pixel electrodes 174 and the data lines 160 becomes more significant. In other words, the second pixel electrodes 174 and the signals of the data lines 160 interfere with each other.

To solve the aforesaid problem, the second capacitor bottom electrodes 190 in this embodiment are, for example, arranged in an H shape, so as to reduce the crosstalk effect between the data lines 160 and the second pixel electrodes 174. To be more specific, the second capacitor bottom electrode 190 in this embodiment comprises a first pattern 190a and a plurality of second patterns 190b connected to the first pattern 190a, wherein the first pattern 190a and the second patterns 190b of the second capacitor bottom electrode 190 may be arranged in an H shape. For instance, the first pattern 190a extends from a first side S1 of the second pixel electrode 174 to a second side S2 thereof, and the second patterns 190b are arranged on the first side S1 and the second side S2, wherein the first side S1 is opposite to the second side S2.

Moreover, at least a portion of the second patterns 190b overlaps a region between the second pixel electrode 174 and the data lines 160. When the liquid crystal display panel 100 displays images, the capacitance coupling effect between the second pixel electrode 174 and the data lines 160 can be effectively reduced to avoid crosstalk effect. In other words, the second patterns 190b of the second capacitor bottom electrode 190 provide favorable shielding effect to reduce the signal interference between the second pixel electrode 174 and the data lines 160.

In other embodiments, the first pattern 190a may be connected to two ends or one end of each second pattern 190b according to the designer's requirements. For example, the first pattern 190a and the second patterns 190b may be arranged in a U shape, a reversed U shape, or an N shape.

Additionally, the liquid crystal display panel 100 may further comprise a plurality of first capacitor top electrodes 220. The first capacitor top electrodes 220 are disposed between the first pixel electrodes 172 and the first capacitor bottom electrodes 180. In other words, the first capacitor top electrodes 220 are disposed in where the first pixel electrodes 172 are located. When the liquid crystal display panel 100 displays images, the storage capacitance formed between the first capacitor bottom electrodes 180 and the first capacitor top electrodes 220 also helps to maintain the voltage difference between the first pixel electrodes 172 and the opposing electrode 140. Certainly, the first capacitor top electrodes 220 may be selectively not disposed between the first pixel electrodes 172 and the first capacitor bottom electrodes 180 in other embodiments. In other words, in where the first pixel electrodes 172 are located, the storage capacitance may be formed only by the capacitance effect between the first pixel electrodes 172 and the first capacitor bottom electrodes 180.

Moreover, the liquid crystal display panel 100 further comprises a plurality of coupling electrodes 230 (FIG. 1B only illustrates one of the coupling electrodes in a single pixel structure), wherein the coupling electrodes 230 extend from where the first pixel electrodes 172 are located to where the second pixel electrodes 174 are located. In the pixel structure 170, the coupling electrode 230 is electrically connected to the active device 176b and the second pixel electrode 174. In other words, the display voltage of the second pixel electrode 174 may be transmitted to the second pixel electrode 174 through the active device 176b and the coupling electrode 230 by the data line 160. In addition, a portion of the area of the coupling electrode 230 overlaps a portion of the area of the second capacitor bottom electrode 190. When the liquid crystal display panel 100 displays images, the storage capacitance effect provided by the coupling electrodes 230 helps to maintain the voltage difference between the second pixel electrodes 174 and the opposing electrode 140.

As shown in FIG. 1A, in this embodiment, the second pixel electrode 174 comprises an intersection pattern 174a and a plurality of stripe patterns 174b apart from each other, wherein the intersection pattern 174a comprises a first direction section 274a and a second direction section 374a. Further, the first direction section 274a and the second direction section 374a interlace each other, wherein the first pattern 190a of the second capacitor bottom electrode 190 is, for example, parallel to the first direction section 274a, and the first direction section 274a is, for example, perpendicular to the second direction section 374a. Moreover, an end of each stripe pattern 174b is connected to the intersection pattern 174a, and the other end of each strip pattern 174b is away from the intersection pattern 174a. The second patterns 190b of the second capacitor bottom electrodes 190 are, for example, arranged under the ends of a portion of the stripe patterns 174b, which are away from the intersection pattern 174a.

Based on the above, the intersection pattern 174a divides the area of the second pixel electrodes into four areas I, II, III, and IV. The stripe patterns 174b in the areas I, II, III, and IV respectively extend from the intersection pattern 174a toward the directions of 45°, 135°, 225°, and 315°. When the liquid crystal display panel 100 displays images, the electric field effect caused by the stripe patterns 174b makes the liquid crystal molecules in the areas I, II, III, and IV tilt toward the directions of 45°, 135°, 225°, and 315°, so as to achieve wide view angle.

It is noted that the first pixel electrodes 172 in this embodiment may also be formed by an intersection pattern (not shown) and a plurality of stripe patterns (not shown). In other words, when the liquid crystal display panel 100 displays images, the liquid crystal molecules above where the first pixel electrodes 172 are located may also be arranged in multi-domain alignment to achieve wide view angle. As a whole, the liquid crystal display panel 100 in this embodiment at least provides the display effects of wide view angle, high display aperture ratio, and high image quality.

Figure 1C:
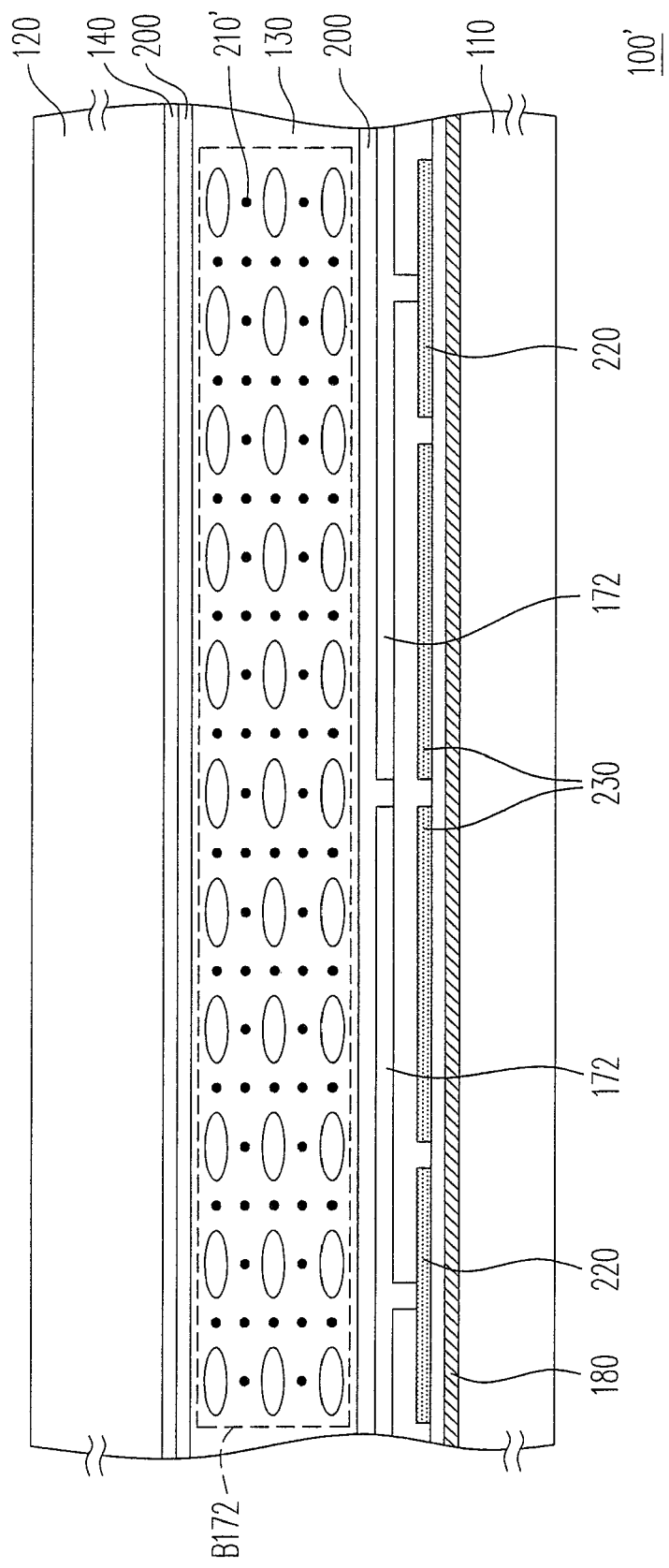
FIGS. 1C and 1D illustrate a method for manufacturing the liquid crystal display panel along line L2-L2' in FIG. 1A.
Figure 1D:
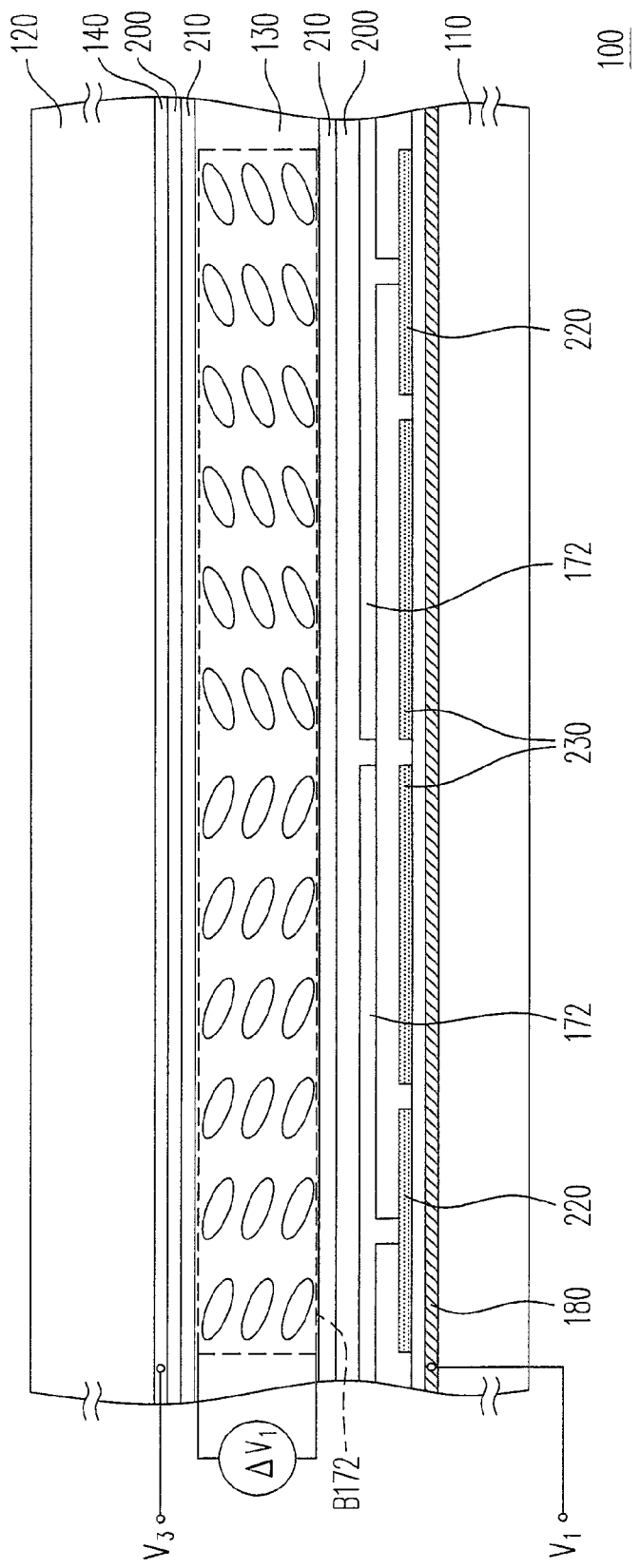
Figure 1E:
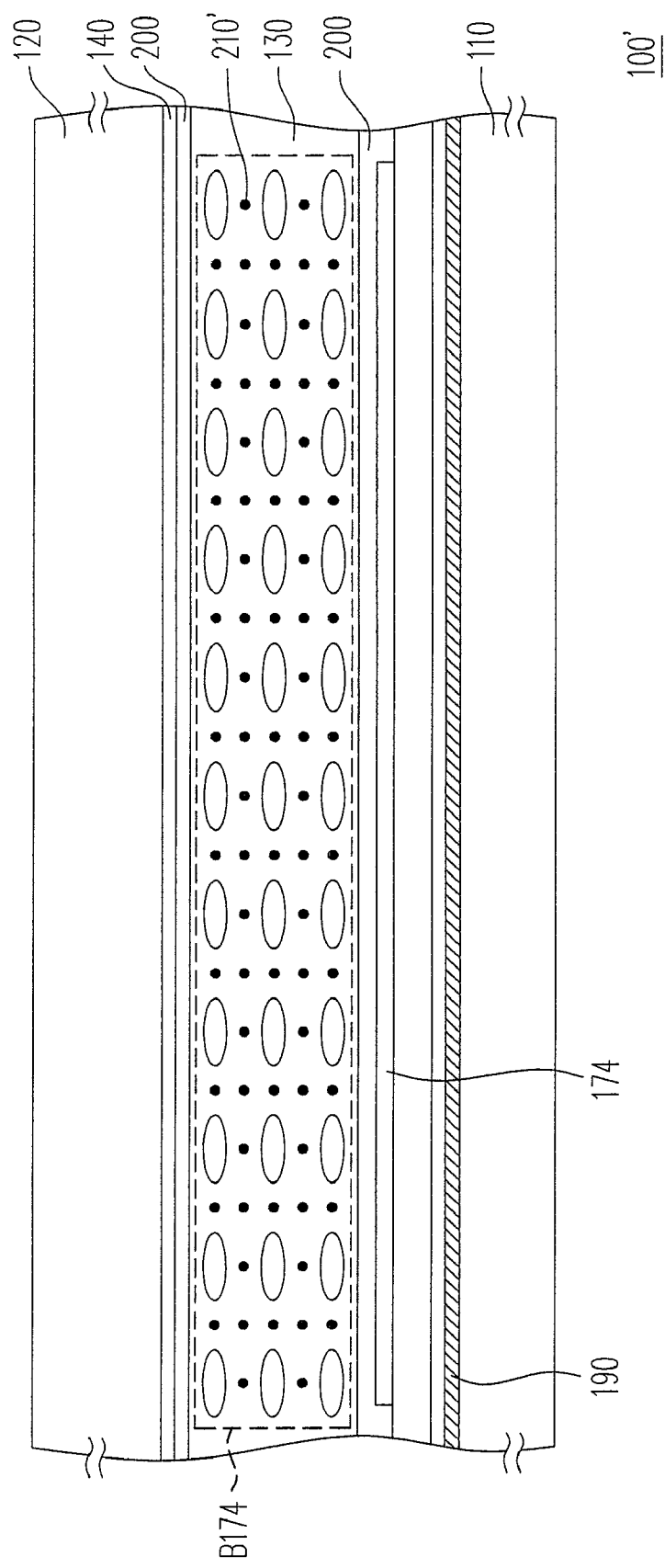
FIGS. 1E and 1F illustrate a method for manufacturing the liquid crystal display panel along line L3-L3' in FIG. 1A.
Figure 1F:
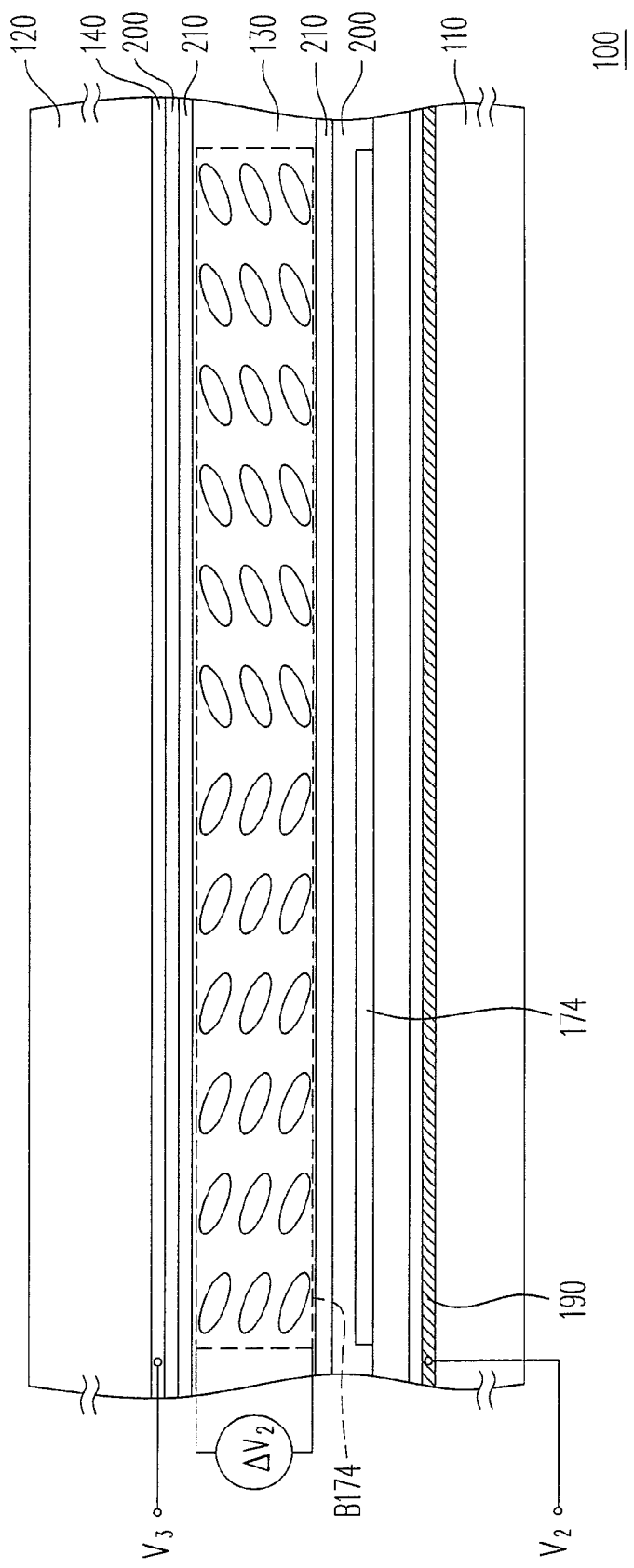

FIGS. 1C and 1D illustrate a method for manufacturing the liquid crystal display panel along line L2-L2' in FIG. 1A, and FIGS. 1E and 1F illustrate a method for manufacturing the liquid crystal display panel along line L3-L3' in FIG. 1A. Referring to FIGS. 1C and 1E, a semi-finished liquid crystal display panel 100' is provided. The semi-finished liquid crystal display panel 100' comprises a first substrate 110, a second substrate 120, a liquid crystal layer 130, an opposing electrode 140, a plurality of scan lines 150, a plurality of data lines 160, a plurality of pixel structures 170, a plurality of first capacitor bottom electrodes 180, a plurality of second capacitor bottom electrodes 190, at least an alignment layer 200, and a plurality of polymerizable molecules (monomers) 210'. The blocks of the liquid crystal layer 130 corresponding to the first pixel electrodes 172 and the second pixel electrodes 174 are respectively the first blocks B172 and the second blocks B174.

The arrangement of the first substrate 110, the second substrate 120, the liquid crystal layer 130, the opposing electrode 140, the scan lines 150, the data lines 160, the pixel structures 170, the first capacitor bottom electrodes 180, the second capacitor bottom electrodes 190, and the alignment layer 200 is similar to that in FIG. 1A. The arrangement of these elements may be referred to in FIG. 1A. Hence, the descriptions thereof are omitted here. It is noted that the polymerizable molecules 210' are doped into the liquid crystal layer 130. The polymerizable molecules 210' are a plurality of photo-polymerizable molecules, for example. Certainly, thermal polymerizable molecules or other molecules which can be polymerized under certain mechanisms may also serve as the polymerizable molecules 210'.

Then, referring to FIGS. 1D and 1F, a first voltage difference $\Delta V_1$ and a second voltage difference $\Delta V_2$ are respectively formed in the first blocks B 172 and the second blocks B174, wherein the first voltage difference $\Delta V_1$ is different from the second voltage difference $\Delta V_2$. At the same time, the first voltage difference $\Delta V_1$ and the second voltage difference $\Delta V_2$ make the liquid crystal molecules in the liquid crystal layer 130 to be arranged in a specific way. After the arrangement of the liquid crystal molecules becomes stable, the polymerizable molecules 210' are polymerized. In this embodiment, an ultraviolet light is used to perform a light illuminating method for polymerizing the polymerizable molecules 210' to form the polymer layer 210 on the first substrate 110 and the second substrate 120 respectively. Thereby, the fabrication of the liquid crystal display panel 100 in this embodiment is roughly completed. In other embodiments, the polymer layer 210 may be formed only on a side of the liquid crystal layer 130 by controlling the fabricating conditions.

In the polymer stabilized alignment process of this embodiment, a method for forming the first voltage difference $\Delta V_1$ and the second voltage difference $\Delta V_2$ is described as follows. Referring to FIG. 1D, in this embodiment, the method for forming the first voltage difference $\Delta V_1$ is, for example, to respectively provide a first voltage $V_1$ and a third voltage $V_3$ to the first capacitor bottom electrodes 180 and the opposing electrode 140. Consequently, the first voltage difference $\Delta V_1$ is formed in the first blocks B 172 by the capacitance coupling effect between the first capacitor bottom electrodes 180 and the first capacitor top electrodes 220, the coupling electrodes 230, and the first pixel electrodes 172. In other words, a specific intensity of electric field is generated in the first blocks B 172.

Additionally, a portion of the coupling electrodes 230 is disposed in where the first pixel electrodes 172 are located, and the other portion of the coupling electrodes 230 is disposed in where the second pixel electrodes 174 are located. Further, the coupling electrodes 230 are electrically connected to the second pixel electrodes 174. Hence, when the first voltage $V_1$ is provided to the first capacitor bottom electrodes 180, the capacitance coupling effect between the coupling electrodes 230 and the first capacitor bottom electrodes 180 also influences the potential of the second pixel electrodes 174.

Moreover, referring to FIG. 1F, a second voltage $V_2$ is provided to the second capacitor bottom electrodes 190 during the polymer stabilized alignment process. As a consequence, capacitance coupling effect also occurs between the second capacitor bottom electrodes 190 and the second pixel electrodes 174. The capacitance coupling effect in where the second pixel electrodes 174 are located is integrated to form the second voltage difference $\Delta V_2$ in the second blocks B174. In other words, another specific intensity of electric field is generated in the second blocks B174.

In brief, the first voltage $V_1$, the second voltage $V_2$, and the third voltage $V_3$ are respectively provided to the first capacitor bottom electrodes 180, the second capacitor bottom electrodes 190, and the opposing electrode 140, wherein the first voltage $V_1$ is larger than or equal to the second voltage $V_2$, and the first voltage difference $\Delta V_1$ is formed in the first blocks B172 and the second voltage difference $\Delta V_2$ is formed in the second blocks B174. In the polymer stabilized alignment process, the first voltage difference $\Delta V_1$ and the second voltage difference $\Delta V_2$ are respectively conducive to polymerize the polymerizable molecules 210' in the first blocks B172 and the second blocks B174 in different forms, so as to form the polymer layer 210. Thereby, the liquid crystal molecules in different areas can be arranged in different pre-tilt angles, for example.

It is noted that, in the polymer stabilized alignment process of this embodiment, the first voltage $V_1$ is substantially larger than the second voltage $V_2$, and the second voltage $V_2$ is substantially equal to the third voltage $V_3$. The first voltage $V_1$ is substantially equal to 0~80 volts, the second voltage $V_2$ is substantially equal to 0~80 volts, and the third voltage $V_3$ is substantially equal to 0~80 volts. According to the top view in FIG. 1A, in where the second pixel electrodes 174 are located, a portion of the second patterns 190b of the second capacitor bottom electrodes 190 is not covered by the second pixel electrodes 174. Hence, if a large voltage is applied to the second capacitor bottom electrodes 190 during the polymer stabilized alignment process, the tilt directions of the liquid crystal molecules above the second patterns 190b easily become indefinite and cause light leakage. Thus, in this embodiment, a smaller voltage, the second voltage $V_2$, is applied to the second capacitor bottom electrodes 190 to avoid the problem of poorly arranged liquid crystal molecules above the second patterns 190b caused by a large voltage.

In this embodiment, the second capacitor bottom electrodes 190 are, for example, arranged in an H shape. Such a design helps to reduce the capacitance coupling effect between the data lines 160 and the second pixel electrodes 174 without influencing the aperture ratio. Furthermore, the second capacitor bottom electrodes 190 are provided with a smaller voltage during the polymer stabilized alignment process, which helps to properly arrange the liquid crystal molecules above the second patterns 190b.

In the polymer stabilized alignment process, the second capacitor bottom electrodes 190 and the opposing electrode 140 are, for example, applied with the same voltage. When the liquid crystal display panel 100 displays images, the first capacitor bottom electrodes 180 and the second capacitor bottom electrodes 190 are also applied with the same voltage as the opposing electrode 140. Therefore, in this embodiment the second capacitor bottom electrodes 190 can be directly electrically connected to the opposing electrode 140, or the second capacitor bottom electrodes 190 and the opposing electrode 140 can be connected to the same voltage source, for example.

Because the liquid crystal molecules in the liquid crystal display panel 100 are tilted and arranged properly, the problems of light leakage and non-uniform display which occur above the second patterns 190b of the second capacitor bottom electrodes 190 are improved. Briefly, the liquid crystal display panel 100 in this embodiment has favorable display quality.

Second Embodiment

Figure 2:
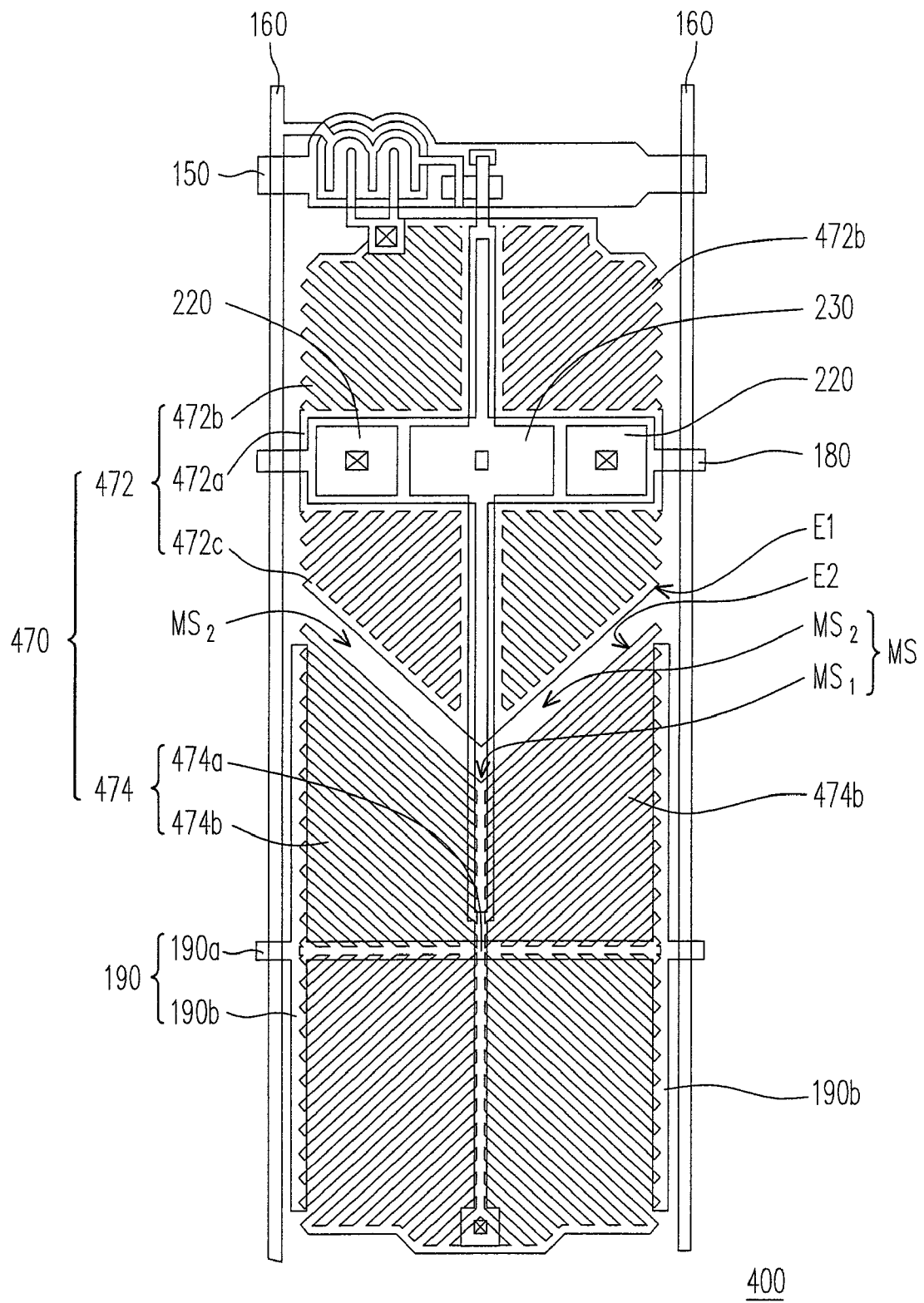
FIG. 2 illustrates a partial top view of a liquid crystal display panel according to the second embodiment of the present invention.

FIG. 2 illustrates a partial top view of a liquid crystal display panel according to the second embodiment of the present invention, and FIG. 2 only illustrates the area of one pixel structure. Referring to FIG. 2, a liquid crystal display panel 400 in this embodiment is similar to the liquid crystal display panel 100 described in the first embodiment. It is to say that FIG. 2 which illustrates this embodiment is similar to FIG. 1A which illustrates the first embodiment, wherein the same elements are indicated by the same reference numbers. The descriptions thereof are therefore not repeated here.

As shown in FIG. 2, in this embodiment, a V-shaped main slit MS is formed between a first pixel electrode 472 and a second pixel electrode 474 of a pixel structure 470, wherein the V-shaped main slit MS comprises a pointed end $MS_1$ and two side sections $MS_2$ connected to the pointed end $MS_1$. The pointed end $MS_1$ is pointed toward the second pixel electrode 474, and an edge E1 of the first pixel electrode 472 and an edge E2 of the second pixel electrode 474 adjacent to each side section $MS_2$ are substantially parallel to each other.

Specifically, the first pixel electrode 472 in this embodiment comprises a first intersection pattern 472a, a plurality of first stripe patterns 472b apart from one another, and a V-shape connection pattern 472c, wherein an end of each first stripe pattern 472b is connected to the first intersection pattern 472a, and the other end thereof is away from the first intersection pattern 472a. The V-shaped connection pattern 472c connects the ends of a portion of the first stripe patterns 472b away from the first intersection pattern 472a and an end of the first intersection pattern 472a close to the V-shaped main slit MS. Additionally, the V-shaped main slit MS is arranged between the V-shaped connection pattern 472c and the second pixel electrode 474. In other words, the edge of the first pixel electrode 472 adjacent to the second pixel electrode 474 is enclosed.

In practice, the second pixel electrode 474 may be formed by a second intersection pattern 474a and a plurality of second stripe patterns 474b apart from one another, wherein two of the second stripe patterns 474b are adjacent to the V-shaped main slit MS. Moreover, an end of each second stripe pattern 474b is connected to the second intersection pattern 474a, and the other end thereof is away from the second intersection pattern 474a.

When the liquid crystal display panel 400 displays images, the liquid crystal molecules respectively tilt along the extended directions of the stripe patterns 472a and 474b, so as to achieve wide view angle. It is noted that the tilt direction of the liquid crystal molecules above one of the side sections $MS_2$ ($MS_2$ at the right side in FIG. 2) is, for example, from 315° to 45°. The tilt direction of the liquid crystal molecules above the other side section $MS_2$ ($MS_2$ at the left side in FIG. 2) is, for example, from 225° to 135°.

When viewing the images displayed by the liquid crystal display panel 400 in a horizontal direction, the liquid crystal molecules above the V-shaped main slit MS do not easily tilt along the directions of 90° or 270°, and thus a poor display area is avoided. Because of the design of the V-shaped main slit MS, color shift and color washout which occur when the liquid crystal display panel 400 is viewed in different angles can be improved.

The fabricating processes of the liquid crystal display panel 400 in this embodiment are similar to those of the liquid crystal display panel 100 in the first embodiment. Hence, persons with ordinary knowledge in this field may refer to FIGS. 1C to 1F and the relevant descriptions for the manufacturing method of the liquid crystal display panel 400 in this embodiment. Based on the above, this embodiment not only has the advantages which the first embodiment has but also further improves the display effects of the liquid crystal display panel 400.

A Third Embodiment

Figure 3A:
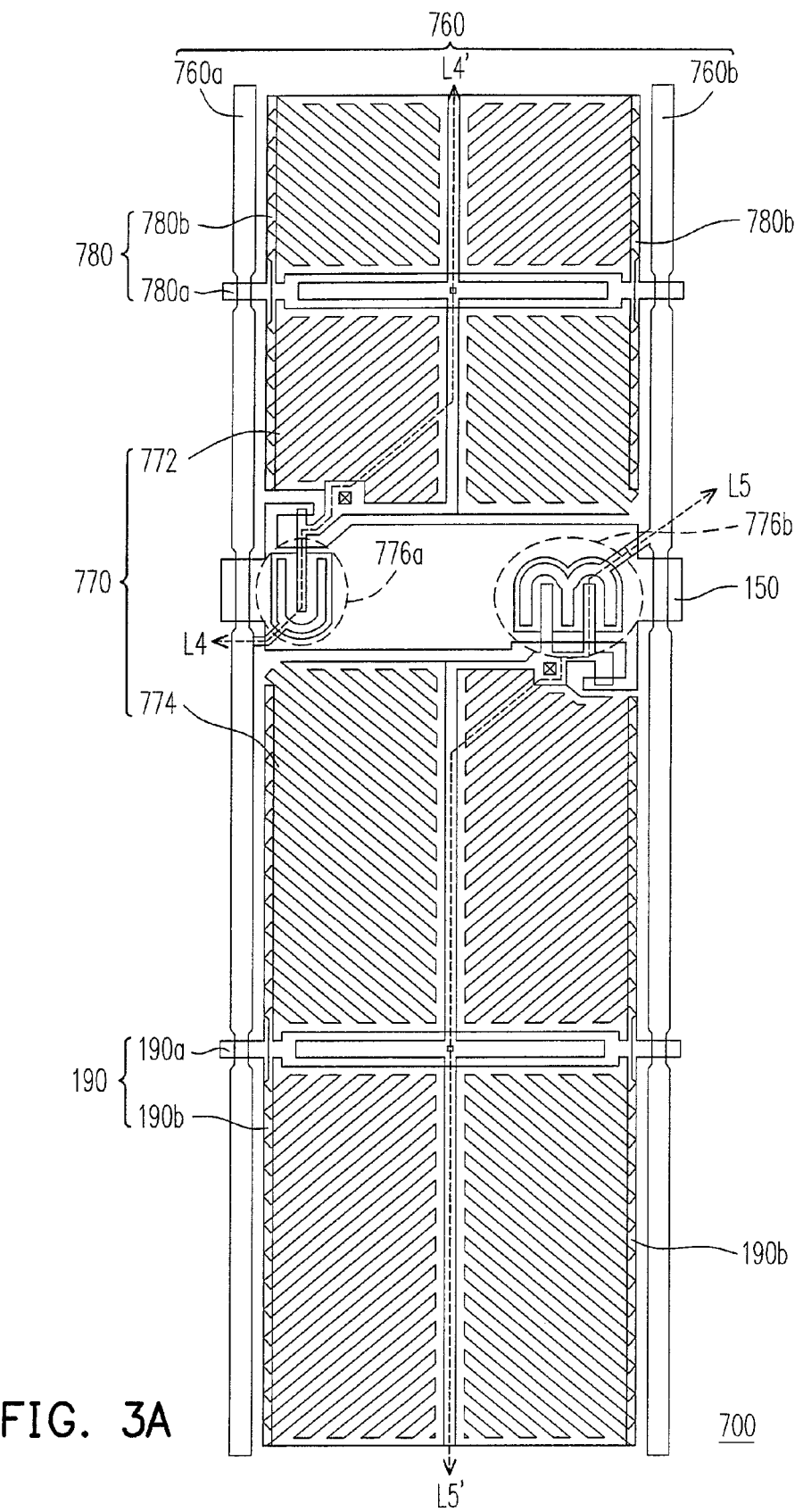
FIG. 3A illustrates a partial top view of a liquid crystal display panel according to the third embodiment of the present invention.

FIG. 3A illustrates a partial top view of a liquid crystal display panel according to the third embodiment of the present invention, and FIG. 3A only illustrates the area of one pixel structure. A liquid crystal display panel 700 in this embodiment is similar to the liquid crystal display panel 100 described in the first embodiment. It is to say that FIG. 3A which illustrates this embodiment is similar to FIG. 1A which illustrates the first embodiment, wherein the same or similar elements are indicated by the same or similar reference numbers. The descriptions thereof are therefore not repeated here.

Referring to FIG. 3A, the liquid crystal display panel 700 in this embodiment comprises a plurality of data lines 760, a plurality of pixel structures 770, a plurality of first capacitor bottom electrodes 780, and a plurality of second capacitor bottom electrodes 190 which are substantially different from those described in the first embodiment.

As shown in FIG. 3A, the pixel structure 770 further comprises a first active device 776a and a second active device 776b. In the pixel structure 770, the first active device 776a and the second active device 776b are electrically connected to the same scan line 150. However, the first active device 776a and the second active device 776b are respectively electrically connected to a data line 760a and a data line 760b. In addition, the first active device 776a and the second active device 776b are respectively electrically connected to a first pixel electrode 772 and a second pixel electrode 774. In other words, the first pixel electrode 772 and the second pixel electrode 774 respectively receive data signals from different data lines 760a and 760b.

It is noted that the first capacitor bottom electrode 780 in this embodiment also comprises a first pattern 780a and a plurality of second patterns 780b, wherein the first pattern 780a and the second patterns 780b may be arranged in an H shape. In other embodiments, the first pattern 780a and the second patterns 780b may also be arranged in a U shape, a reversed U shape, or an N shape. Certainly, the first capacitor bottom electrode 780 is not necessarily formed by the first pattern 780a and the second patterns 780b. According to the designer's requirements, the first capacitor bottom electrode 780 in this embodiment may be designed to be similar to the first capacitor bottom electrode 180 in the first or the second embodiment.

In the H-shaped first capacitor bottom electrodes 780 and the H-shaped second capacitor bottom electrodes 190 of this embodiment, the second patterns 780b and the second patterns 190b both provide proper shielding effect. Accordingly, the crosstalk effects between the data lines 760 and the first pixel electrodes 772 and between the data lines 760 and the second pixel electrodes 774 are improved. In other words, the liquid crystal display panel 700 provides favorable display quality. However, H-shaped first capacitor bottom electrodes 780 and straight-line type second capacitor bottom electrodes parallel to the scan lines 150, or straight-line type first capacitor bottom electrodes parallel to the scan lines 150 and H-shaped second capacitor bottom electrodes 190 may be also applied in this embodiment, but the present invention is not limited thereto.

Figure 3B:
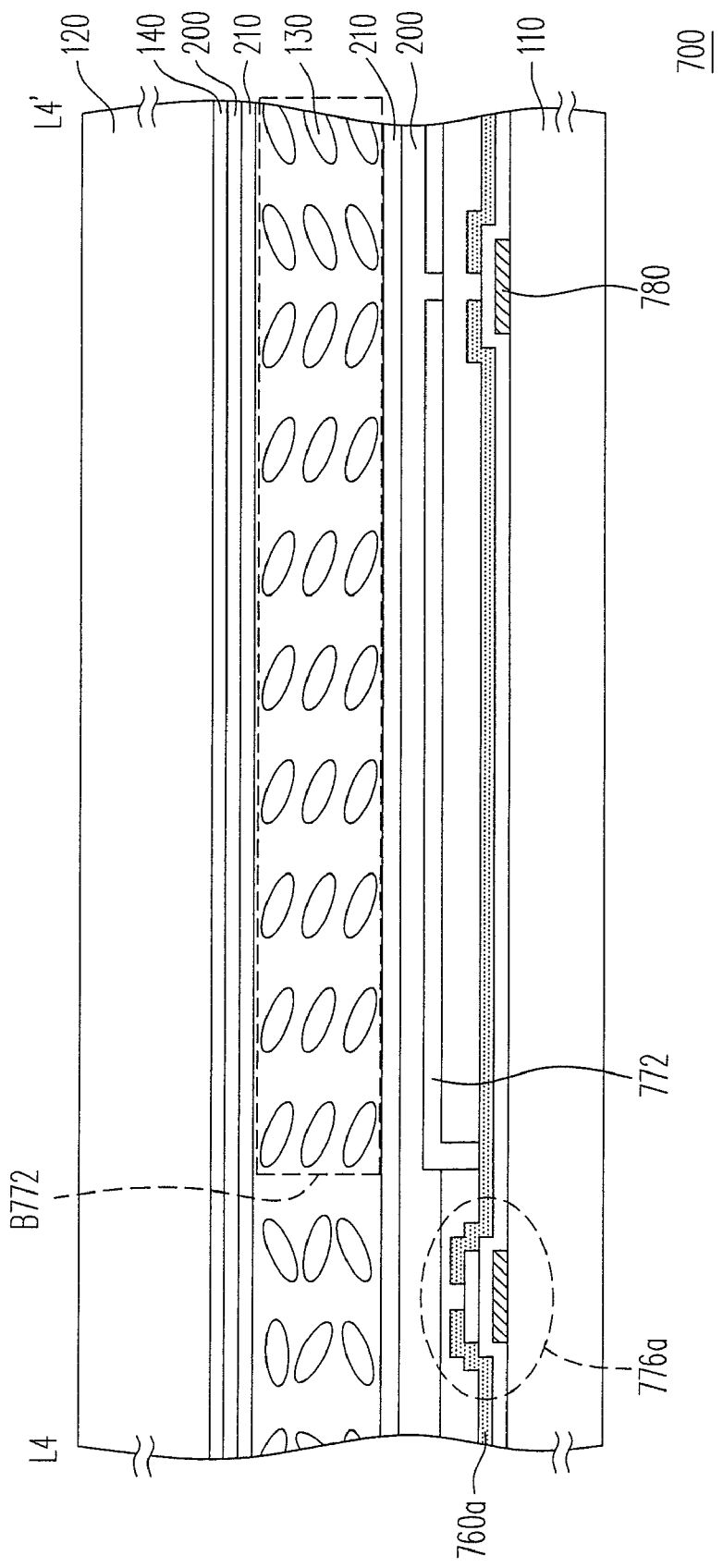
FIG. 3B illustrates a cross-sectional view of the liquid crystal display panel in the third embodiment.
Figure 3C:
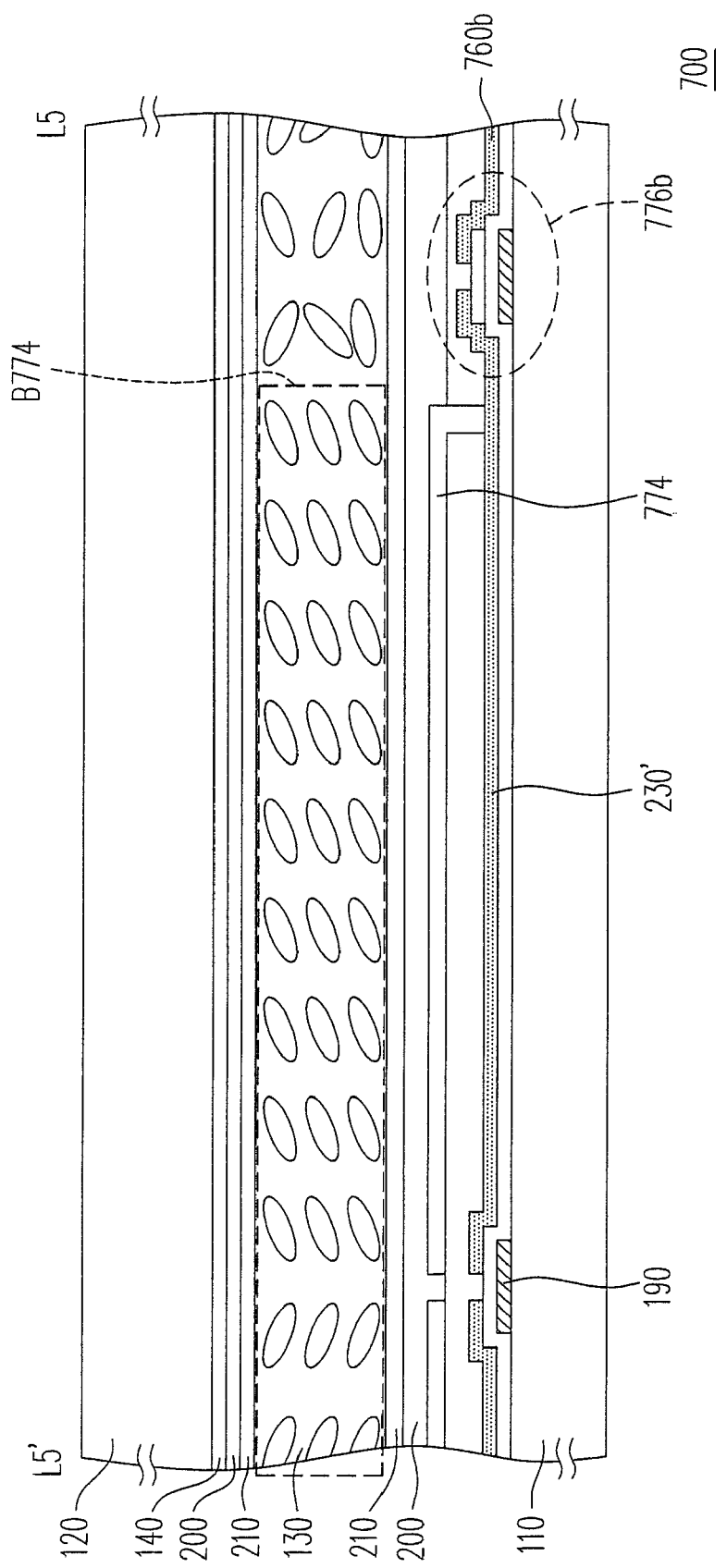
FIG. 3C illustrates another cross-sectional view of the liquid crystal display panel in the third embodiment.

Further, FIG. 3B is, for example, a cross-sectional view along Line L4-L4' in FIG. 3A, and FIG. 3C is, for example, a cross-sectional view along Line L5-L5' in FIG. 3A. Referring to the cross-sectional views in FIGS. 3B and 3C, the liquid crystal display panel 700 further comprises the alignment layer 200 and the polymer layer 210 disposed between the first substrate 110 and the second substrate 120. It is to say that the liquid crystal display panel 700 in this embodiment is a polymer stabilized alignment liquid crystal display panel.

The polymer stabilized alignment process requires respectively forming a voltage difference between the first pixel electrodes 772 and the opposing electrode 140 and between the second pixel electrodes 774 and the opposing electrode 140. To form the voltage differences, conventionally a relative larger voltage is applied to the first capacitor bottom electrodes 780 and the second capacitor bottom electrodes 190, and a relative smaller voltage is applied to the opposing electrode 140. However, a portion of the areas of the H-shaped first capacitor bottom electrodes 780 and second capacitor bottom electrodes 190 in this embodiment is not covered by the corresponding pixel electrodes (772 and 774). When the larger voltage is applied to the first capacitor bottom electrodes 780 and the second capacitor bottom electrodes 190, the arrangement of the liquid crystal molecules may be disordered due to the exposure of the second patterns 780*b* and 190*b*.

Moreover, the scan lines 150 in this embodiment are arranged between the first pixel electrodes 772 and the second pixel electrodes 774. Consequently, when the data lines 760*a* and 760*b* are respectively electrically connected to the first pixel electrodes 772 and the second pixel electrodes 774 through the first active device 776*a* and the second active device 776*b*, the signals of the data line 760*b* are not required to be transmitted to the second pixel electrodes 774 through the first pixel electrodes 772. Hence, besides the methods mentioned in the aforesaid embodiments, the polymer stabilized alignment process in this embodiment can also utilize the data lines 760*a* and 760*b* to apply different voltages to the first pixel electrodes 772 and the second pixel electrodes 774.

To be more specific, the polymer stabilized alignment process in this embodiment uses the first and the second active devices 776*a* and 776*b* to respectively transmit a first voltage $V_1'$ and a second voltage $V_2'$ provided by the data lines 760*a* and 760*b* to the first pixel electrodes 772 and the second pixel electrodes 774, and provides a third voltage $V_3'$ to the opposing electrode 140, wherein the first voltage $V_1'$ and the second voltage $V_2'$ are not equal. For instance, the first voltage $V_1'$ is substantially equal to 0~80 volts, the second voltage $V_2'$ is substantially equal to 0~80 volts, and the third voltage $V_3'$ is substantially equal to 0~80 volts. Thereby, the first blocks B772 and the second blocks B774 have different voltage differences. It is to say that the first blocks B772 and the second blocks B774 have different intensity of electric field. In other words, this embodiment does not respectively apply large voltages to the first capacitor bottom electrodes 780 and the second capacitor bottom electrodes 190. Consequently, during the polymer stabilized alignment process, a high voltage difference does not exist between the opposing electrode 140 and the first and the second capacitor bottom electrodes 780 and 190 not covered by the first and the second pixel electrodes 772 and 774. Hence, the arrangement of the liquid crystal molecules above the second patterns 780*b* (belong to the first capacitor bottom electrodes 780) and the second patterns 190*b* (belong to the second capacitor bottom electrodes 190) is not disordered.

Figure 3D:
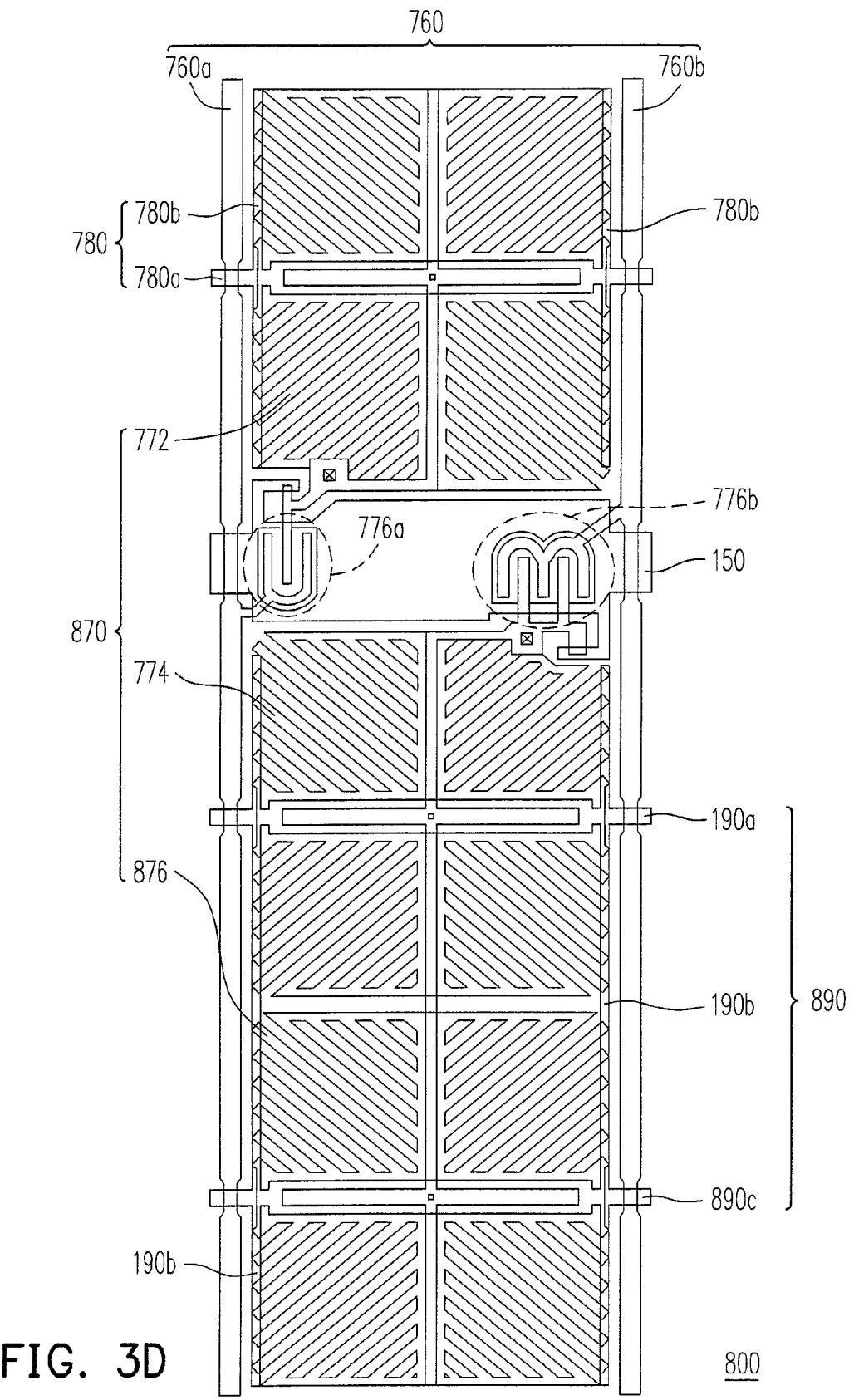
FIG. 3D illustrates a top view of another liquid crystal display panel according to the third embodiment of the present invention.

In addition, FIG. 3D illustrates a top view of another liquid crystal display panel according to the third embodiment of the present invention. Referring to a liquid crystal display panel 800 in FIG. 3D, a pixel structure 870 in this embodiment further comprises a third pixel electrode 876, wherein the third pixel electrode 876 is electrically connected to the second pixel electrode 774. Additionally, the second capacitor bottom electrode 890 further comprises a third pattern 890*c*, wherein the third pattern 890*c* is disposed between the third pixel electrode 876 and the first substrate 110 to be approximately parallel to the first pattern 190*a*. A portion of the second patterns 190*b* further extends to a side of the third pixel electrode 876 to connect the third pattern 890*c*. In addition to the advantages of the liquid crystal display panel 700, the liquid crystal display panel 800 achieves the effect of alignment in more domains of the liquid crystal molecules.

Figure 3E:
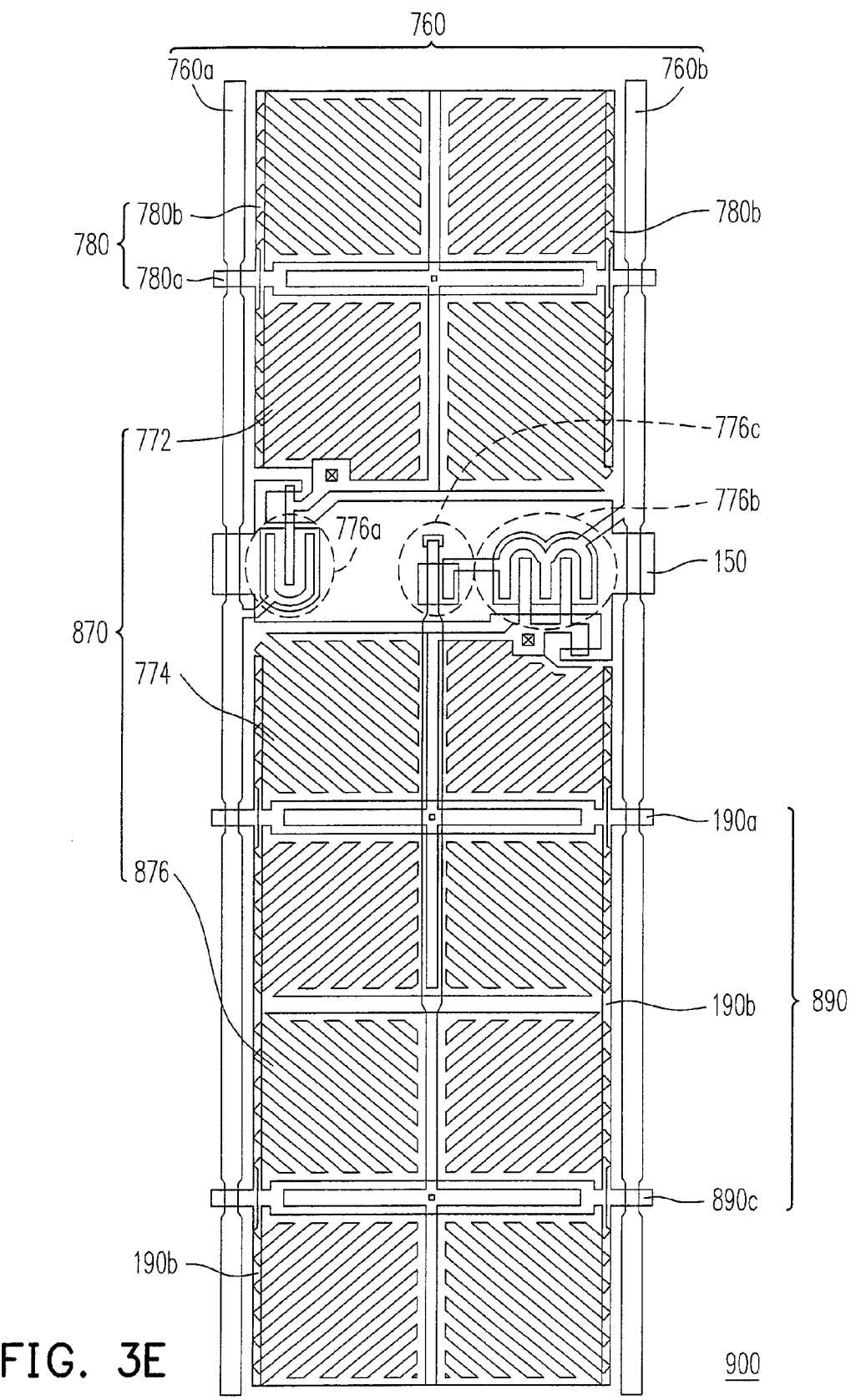
FIG. 3E illustrates a top view of yet another liquid crystal display panel according to the third embodiment of the present invention.

Further, FIG. 3E illustrates a top view of yet another liquid crystal display panel according to the third embodiment of the present invention. Referring to FIG. 3E, a liquid crystal display panel 900 is substantially similar to the liquid crystal display panel 800. The difference merely lies in that the liquid crystal display panel 900 further comprises a plurality of third active devices 776*c* electrically connected to the third pixel electrode 876. In addition, the third active devices 776*c* are electrically coupled with the second active devices 776*b*. In other words, the third active devices 776*c* and the second active devices 776*b* are electrically connected to the same scan lines 150 and data lines 760*b*, and the third pixel electrode 876 is driven by the third active devices 776*c*. In this embodiment, the designs of the third active devices 776*c* and the second active devices 776*b* are different, such that the second pixel electrode 774 and the third pixel electrode 876 can have different display voltages. Thereby, the display effects of the liquid crystal display panel 900 are further improved.

As shown in FIG. 3E, in this embodiment, the second pixel electrode 774 and the third pixel electrode 876 are respectively driven by the second active devices 776*b* and the third active devices 776*c*. To be more specific, during the polymer stabilized alignment process, the voltages applied by the data lines 760*b* are respectively transmitted to the second and the third pixel electrodes 774 and 876 through the second and the third active devices 776*b* and 776*c*, so as to achieve different alignments of the liquid crystal molecules over the second and the third pixel electrodes 774 and 876. In brief, besides the advantages of the liquid crystal display panel 800, the liquid crystal display panel 900 achieves the effect of alignment in much more domains of the liquid crystal molecules.

Figure 3F:
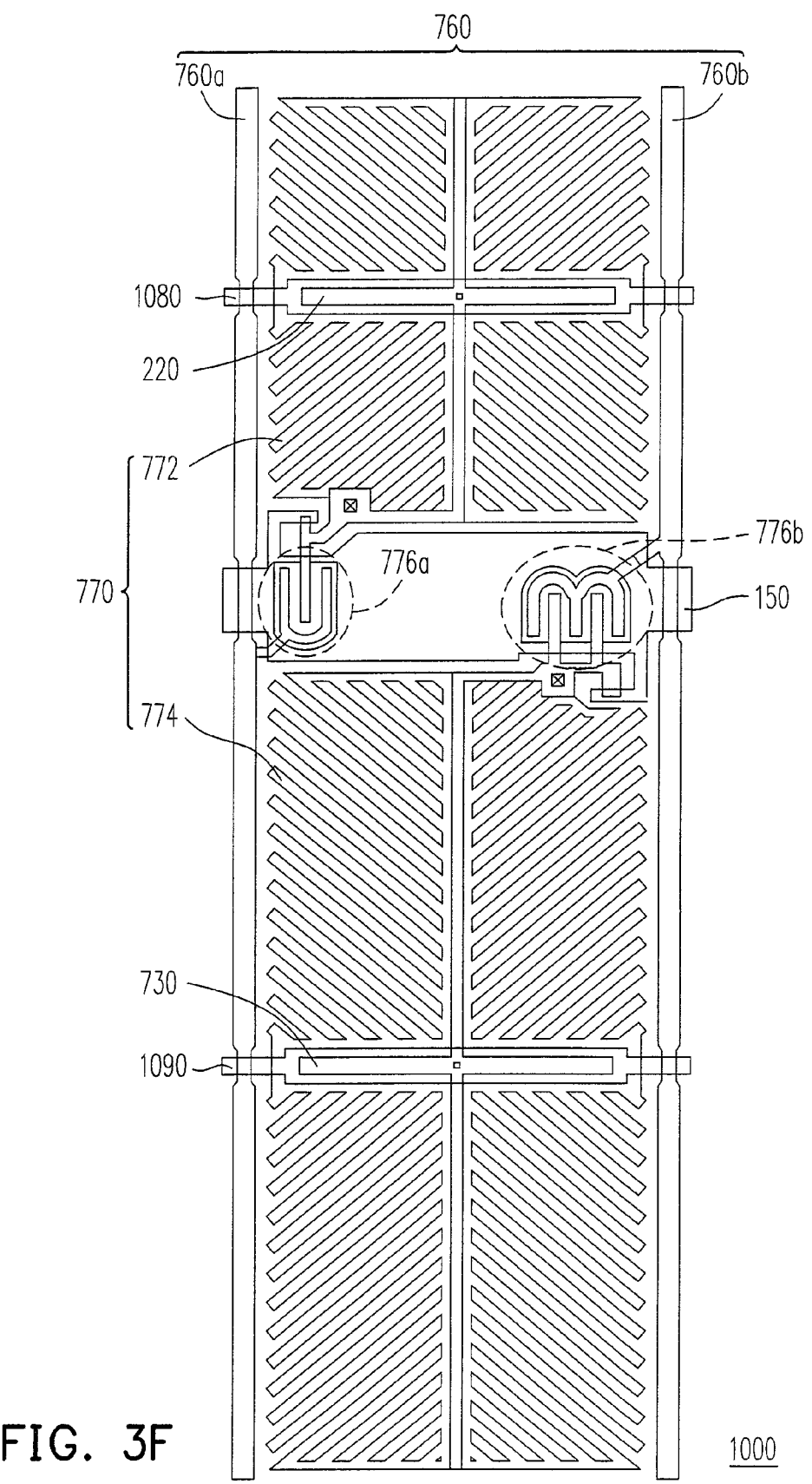
FIGS. 3F and 3G illustrate the top views of another two liquid crystal display panels according to the third embodiment of the present invention.
Figure 3G:
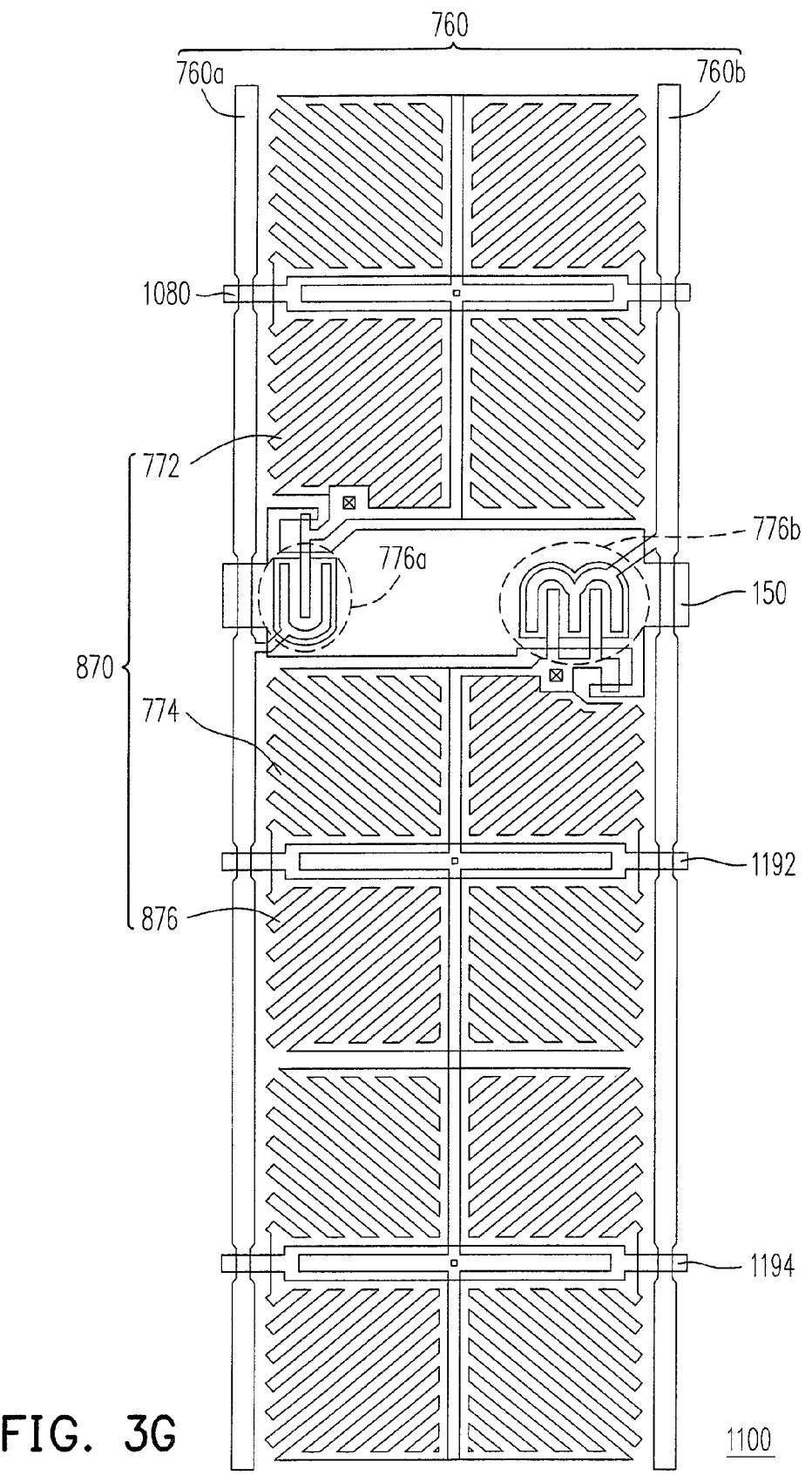

Certainly, the present invention is not limited thereto. FIGS. 3F and 3G illustrate yet another two liquid crystal display panels according to the third embodiment of the present invention. Referring to FIG. 3F, a liquid crystal display panel 1000 is substantially similar to the aforesaid liquid crystal display panel 700. However, in the liquid crystal display panel 1000, the first capacitor bottom electrodes 1080 and the second capacitor bottom electrodes 1090 are designed to be straight-line type capacitor electrodes. On the other hand, referring to FIG. 3G, a liquid crystal display panel 1100 is substantially similar to the aforesaid liquid crystal display panel 800, wherein the first capacitor bottom electrodes 1080, the second capacitor bottom electrodes 1192, and the third capacitor bottom electrodes 1194 in the liquid crystal display panel 1100 are straight-line design.

Specifically, the liquid crystal display panels 1000 and 1100 are both polymer stabilized alignment liquid crystal display panels, and each pixel structure is driven by two data lines 760*a* and 760*b* and one scan line 150. In this embodiment, the first capacitor bottom electrodes 1080, the second capacitor bottom electrodes 1090 and 1192, and the third capacitor bottom electrodes 1194 are all straight-line design. The polymer stabilized alignment process is performed on the liquid crystal display panels 1000 and 1100 in two ways: one is to input signals to the aforesaid capacitor bottom electrodes 1080, 1090, 1192, and 1194, so as to form the voltage differences or electric field intensity required in the polymer stabilized alignment process between these pixel electrodes 772, 774, and 876 and the opposing electrode 140; the other is to use different data lines 760*a* and 760*b* for inputting different signals to the corresponding pixel electrodes 772, 774, and 876, so as to form the voltage differences required in the polymer stabilized alignment process between the pixel electrodes 772, 774, and 876 and the opposing electrode 140. In brief, the designs of the liquid crystal display panels 1000 and 1100 help to make the polymer stabilized alignment process more flexible.

Figure 4:
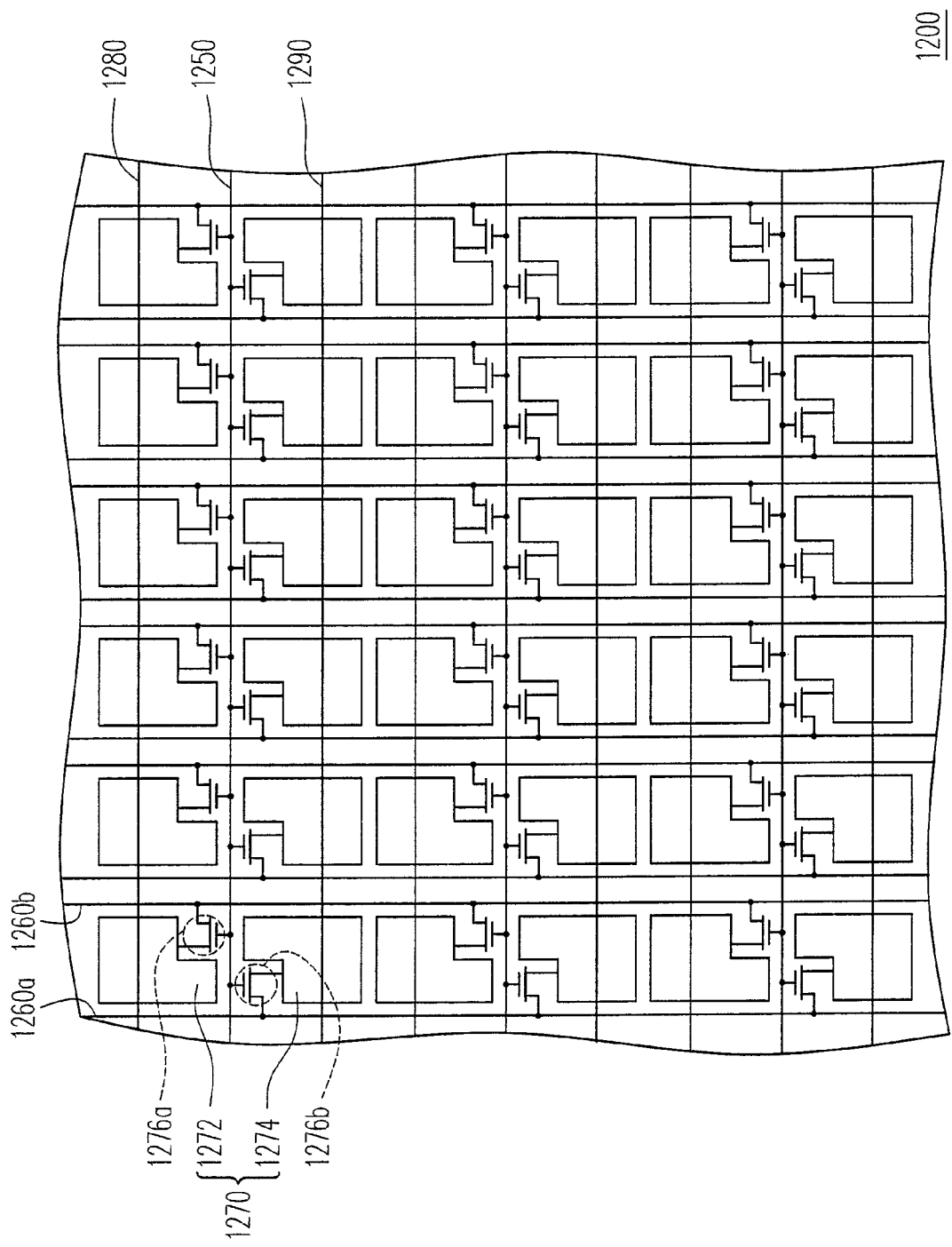
FIG. 4 illustrates an equivalent circuit diagram of the liquid crystal display panel according to the third embodiment of the present invention.

To clearly explain the various liquid crystal display panels in the third embodiment of the present invention, FIG. 4 illustrates an equivalent circuit diagram of the liquid crystal display panel according to the third embodiment of the present invention. Referring to FIG. 4, a liquid crystal display panel 1200 in this embodiment comprises a plurality of scan lines 1250, a plurality of data lines 1260*a* and 1260*b*, a plurality of pixel structures 1270, a plurality of first capacitor bottom electrodes 1280, and a plurality of second capacitor bottom electrodes 1290.

Specifically, in this embodiment, the scan lines 1250 and the data lines 1260*a* and 1260*b* are arranged to define where a plurality of pixel structures 1270 is located, such that the pixel structures 1270 are arranged as an array. In addition, each pixel structure 1270 may be formed by a first pixel electrode 1272 and a second pixel electrode 1274. The first pixel electrode 1272 and the second pixel electrode 1274 are electrically connected to the same scan line 1250, and respectively electrically connected to different data lines 1260*a* and 1260*b*. Moreover, the first and the second capacitor bottom electrodes 1280 and 1290 are respectively electrically coupled to the first and the second pixel electrodes 1272 and 1274. When the liquid crystal display panel 1200 displays images, the first and the second pixel electrodes 1272 and 1274 respectively receive the data signals transmitted by the data lines 1260*a* and 1260*b* through the first and the second active devices 1276*a* and 1276*b*, and voltages are applied to the first and the second capacitor bottom electrodes 1280 and 1290 to maintain the data signals in the first and the second pixel electrodes 1272 and 1274. Herein, the first and the second capacitor bottom electrodes 1280 and 1290 are applied with the same voltage.

To conclude, in the design of the liquid crystal display panel of the present invention, the second capacitor bottom electrodes provide favorable shielding effect to prevent the crosstalk effect between the second pixel electrodes and the data lines. Further, during the polymer stabilized alignment process, the first and the second capacitor bottom electrodes may be selectively applied with different potentials or not applied with any voltages. Consequently, the liquid crystal molecules in each pixel structure of the liquid crystal display panel are tilted and arranged properly. The problems of light leakage and non-uniform display which occur when the liquid crystal display panel displays images are thereby improved. Additionally, when the V-shaped main slit is formed between the first and the second pixel electrodes, the liquid crystal molecules above the V-shaped main slit are tilted in a proper direction to enhance the display quality of the liquid crystal display panel. As a whole, the liquid crystal molecules in the liquid crystal display panel are arranged to achieve the effect of multi-domain alignment and further to improve the wide view angle effect of the liquid crystal display panel. In addition to the above, the liquid crystal display panel of the present invention has the advantages of high aperture ratio, low crosstalk effect, and so forth.

Although the present invention has been disclosed by the above embodiments, they are not intended to limit the present invention. Anybody with ordinary knowledge in the art may make some modifications and alterations without departing from the spirit and scope of the present invention. Therefore, the protection range of the present invention falls in the appended claims.

What is claimed is:

1. A manufacturing method of a liquid crystal display panel, comprising:
  providing a semi-finished liquid crystal display panel, the semi-finished liquid crystal display panel comprising:
    a first substrate;
    a second substrate opposite to the first substrate;
    a liquid crystal layer disposed between the first substrate and the second substrate;
    an opposing electrode arranged between the second substrate and the liquid crystal layer;
    a plurality of scan lines disposed between the first substrate and the liquid crystal layer;
    a plurality of data lines disposed between the first substrate and the liquid crystal layer;
    a plurality of polymerizable molecules located between the first substrate and the second substrate;
    a plurality of pixel structures disposed on the first substrate and electrically connected to the scan lines and the data lines, each pixel structure comprising a first pixel electrode and a second pixel electrode, wherein blocks of the liquid crystal layer corresponding to the first pixel electrodes are a plurality of first blocks and wherein blocks of the liquid crystal layer corresponding to the second pixel electrodes are a plurality of second blocks;
    a plurality of first capacitor bottom electrodes disposed between the first pixel electrodes and the first substrate; and
    a plurality of second capacitor bottom electrodes disposed between the second pixel electrodes and the first substrate, each second capacitor bottom electrode comprising a first pattern and at least one second pattern connected to the first pattern, the first pattern extending from a first side to an opposite second side, and the at least one second pattern being disposed on the first side, wherein at least a portion of the at least one second pattern overlaps a region between the second pixel electrodes and the data lines; and
  respectively forming a first voltage difference in the first blocks and forming a second voltage difference in the second blocks to polymerize the polymerizable molecules to form the liquid crystal display panel.

2. The manufacturing method as claimed in claim 1, wherein the step of forming the first voltage difference and the second voltage difference comprises respectively providing a first voltage, a second voltage, and a third voltage to the first capacitor bottom electrode, the second capacitor bottom electrode, and the opposing electrode.

3. The manufacturing method as claimed in claim 2, wherein the first voltage is larger than or equal to the second voltage.

4. The manufacturing method as claimed in claim 2, wherein the second voltage is equal to the third voltage.

5. The manufacturing method as claimed in claim 2, wherein the first voltage is substantially equal to 0~80 volts, the second voltage is substantially equal to 0~80 volts, and the third voltage is substantially equal to 0~80 volts.

6. The manufacturing method as claimed in claim 1, wherein the first pixel electrode and the second pixel electrode of each pixel structure are electrically connected to different data lines, and for the step of forming the first voltage difference and the second voltage difference comprises:
  respectively providing a first voltage and a second voltage to the first pixel electrodes and the second pixel electrodes through the data lines; and
  providing a third voltage to the opposing electrode.

7. The manufacturing method as claimed in claim 6, wherein the first voltage is substantially equal to 0~80 volts, the second voltage is substantially equal to 0~80 volts, and the third voltage is substantially equal to 0~80 volts.

8. The manufacturing method as claimed in claim 1, wherein the polymerizable molecules include a plurality of photo-polymerizable molecules, and for the step of polymerizing the polymerizable molecules comprises a light illuminating method.

9. The manufacturing method as claimed in claim 8, wherein the light illuminating method is to use an ultraviolet light.

10. The manufacturing method as claimed in claim 1, wherein the polymerizable molecules are polymerized on the first substrate to form at least a polymer layer between the alignment layer and the liquid crystal layer.

* * * * *